United States Patent [19]
Liu

[11] Patent Number: 5,390,547
[45] Date of Patent: Feb. 21, 1995

[54] MULTIPHASE FLOW SEPARATION AND MEASUREMENT SYSTEM

[76] Inventor: Ke-Tien Liu, 17149 Leal Ave., Cerritos, Calif. 90701

[21] Appl. No.: 153,328

[22] Filed: Nov. 16, 1993

[51] Int. Cl.$^6$ .............................................. G01F 15/08
[52] U.S. Cl. ................................... 73/861.04; 73/200
[58] Field of Search .......................... 73/200, 861.04; 137/392

[56] References Cited

U.S. PATENT DOCUMENTS

| | | | |
|---|---|---|---|
| 2,882,995 | 4/1959 | Smith | 73/200 |
| 4,688,418 | 8/1987 | Cheung et al. | 73/200 |
| 4,760,742 | 8/1988 | Hatton | 73/861.04 |
| 4,773,257 | 9/1988 | Aslesen et al. | 73/61.1 R |
| 4,852,395 | 8/1989 | Kolpak | 73/861.04 |
| 4,881,412 | 11/1989 | Northedge | 73/861.04 |
| 4,951,700 | 8/1990 | Kalman | 137/174 |
| 5,099,697 | 3/1992 | Agar | 73/861.04 |
| 5,195,380 | 3/1993 | Hatton et al. | 73/861.04 |

Primary Examiner—Richard E. Chilcot, Jr.
Assistant Examiner—Harshad Patel
Attorney, Agent, or Firm—Townsend and Townsend Khourie and Crew

[57] ABSTRACT

A system 100 for measuring the relative flow rates of various components in a multiphase mixture. The system includes an inlet 114 connected to a larger horizontal flow line section 118. Gas flows to a gas flow line 122 from the inlet and/or the horizontal section. Gas flow is measured in a gas flow meter 105 and liquid flow rate is measured in a flow meter 108. Optionally, two phase liquid flow is monitored with a cut meter 110.

18 Claims, 4 Drawing Sheets

MULTIPHASE FLOW SEPARATION AND MEASUREMENT SYSTEM

BACKGROUND OF THE INVENTION

The present invention relates to the field of multiphase flow measurement. The invention is illustrated in one example with regard to the measurement of multiphase flow from individual oil wells, but it will be recognized that the invention will have a wider range of applicability. Merely by way of example, the invention may be applied in the food processing industry, wet steam measurement, and others.

Industry utilizes or has proposed several methods to measure the production of individual oil wells. The conventional approach is to use a three-phase or two phase separator to separate the multi-phase fluid mixture into distinctive phases. In the case where a three-phase separator is employed, three separate outgoing streams (gas, free water, and an oil/water emulsion) are produced. Separate flow meters measure the respective flow rates of the outgoing streams of oil, water, and gas. An on-line "cut" meter determines the water content of the emulsion stream. The two-phase separator operates similarly to the three-phase separator except that the free water stream is omitted.

These test separators are relatively large in physical size, expensive to construct, and require an abundance of ancillary pressure control and flow regulating equipment. Accordingly, users of this approach do not provide the separators for an individual oil well. Instead, a single test separator services a group of wells. Each individual well is placed "on test" for a relatively short period of time, and its production is determined. After the well is removed from test, it is assumed that the production from the well does not vary substantially until the well is again placed on test.

Another approach involves measuring multiphase flow without the use of a separator. In U.S. Pat. No. 5,099,697, Agar uses two volumetric-type flow meters connected in series to measure multiphase flow. A flow restriction device between the flow meters produces a pressure drop between the meters. Combining the measurements of pressure drop between the two flow meters, the flow rates from the flow meters, and the phase fraction from a phase fraction meter, a flow computer calculates the respective flow rates of each phase components.

Another approach, such as that described by Northedge in U.S. Pat. No. 4,881,412, involves measuring the total flow rate of the multiphase fluid, taking a relatively small fluid sample from the bulk flow line and determining the phase fractions in the sample by various measurement means. This approach suffers the shortcomings of obtaining representative sample from the flow line and finding reliable on-line techniques to measure the phase fractions in the fluid sample.

Still another approach, such as that described in U.S. Pat. No. 4,951,700, involves using a small in-line gas separator to produce a gas stream and a liquid stream. The respective flow rates and liquid phase fractions are then measured. One major drawback of this approach is that the separator often does not provide adequate retention time for the entrained gas to be completely separated from the liquid phase. Measurement accuracy and equipment integrity in the liquid stream are greatly hampered by the gas-bearing liquid.

From the above it is seen that a continuous and accurate multi-phase flow measurement apparatus that is compact, low cost, reliable, and requires little maintenance is desired.

SUMMARY OF THE INVENTION

The present invention pertains to a method and apparatus for continuously and respectively measuring the quantities of one gas and one or two liquid components flowing concurrently in a common pipeline. The mixture delivered by a feed pipeline is separated into two separate streams of gas and liquid by means of a novel piping configuration. The system then measures the flow rate in each stream individually. If there are multiple liquid components in the liquid phase, an on-line liquid fraction meter determines the proportion of each liquid component. The piping system then combines the two flow streams to a common discharge pipeline.

In one specific embodiment, the system is applied to measure the flow rates of crude oil, water, and natural gas from a production well or a group of production wells. Further, the system can be applied to measure the flow rates of saturated steam and saturated water in a low quality, wet steam flow stream.

Accordingly, in one embodiment the invention provides a system for determining the flow rate of at least first and second components in a multiphase flow stream. The system includes a substantially horizontal flow line coupled to an inlet flow line. Such substantially horizontal flow line is of significantly greater cross-sectional area than the inlet flow line. A gas flow line is adapted to the system to receive gas from the inlet flow line. The system also provides a level control means in the substantially horizontal flow line which is coupled to a liquid discharge line and adapted to retain a substantially constant level in the horizontal flow line. The liquid discharge lines are of significantly smaller cross-sectional area than the horizontal flow line. To measure liquid in the discharge line, a liquid flow measurement means in the liquid discharge line is also included. The system further provides a gas flow measurement means in the gas flow line.

In an alternative embodiment, the system provides a vertical pipe section coupling the inlet flow line to the substantially horizontal flow line and the gas flow line of the previous embodiment. The inlet flow line enters the vertical pipe section at an intermediate portion thereof. Preferably, the vertical pipe section has a larger cross-sectional area than the substantially horizontal flow line.

Still a further embodiment, the system provides various alternative means for measuring flow rates and controlling liquid levels. The system includes a means for determining the relative flow rates of two liquid phases in the liquid flow line. Such relative flow rates means includes a coriolis flow meter and a microprocessor for calculating the relative flow rates based on the output of the coriolis flow meter. The system further includes a level control with a level sensing means in the horizontal flow line. A level control valve in the gas flow line is coupled to the level sensing means. The control valve restricts flow through the gas flow line as the liquid level rises in the horizontal flow line.

The invention further provides a method for determining the flow rate of at least first and second components in a multiphase flow stream. The method includes the steps of passing the multiphase flow stream having at least a first component and a second component from an inlet flow line through a substantially horizontal flow line. The substantially horizontal flow line is of significantly greater cross-sectional area than the inlet flow line. The method also provides controlling the multiphase flow stream to retain a substantially constant level in the horizontal flow line. A step of separating the first component from the multiphase flow stream in the horizontal flow line through a gas flow line adapted to receive gas from the inlet flow line is also provided. The remaining portion of the multiphase flow stream comprising at least the second component in the horizontal flow line is transferred into a liquid discharge line. Thereafter, the method provides a step of measuring at least the second component in the liquid discharge line, and measuring at least the first component in the gas flow line.

A further understanding of the nature and advantages of the invention will become apparent by reference to the remaining portions of the specification and drawings.

DESCRIPTION OF SPECIFIC EMBODIMENTS

Figure 1:
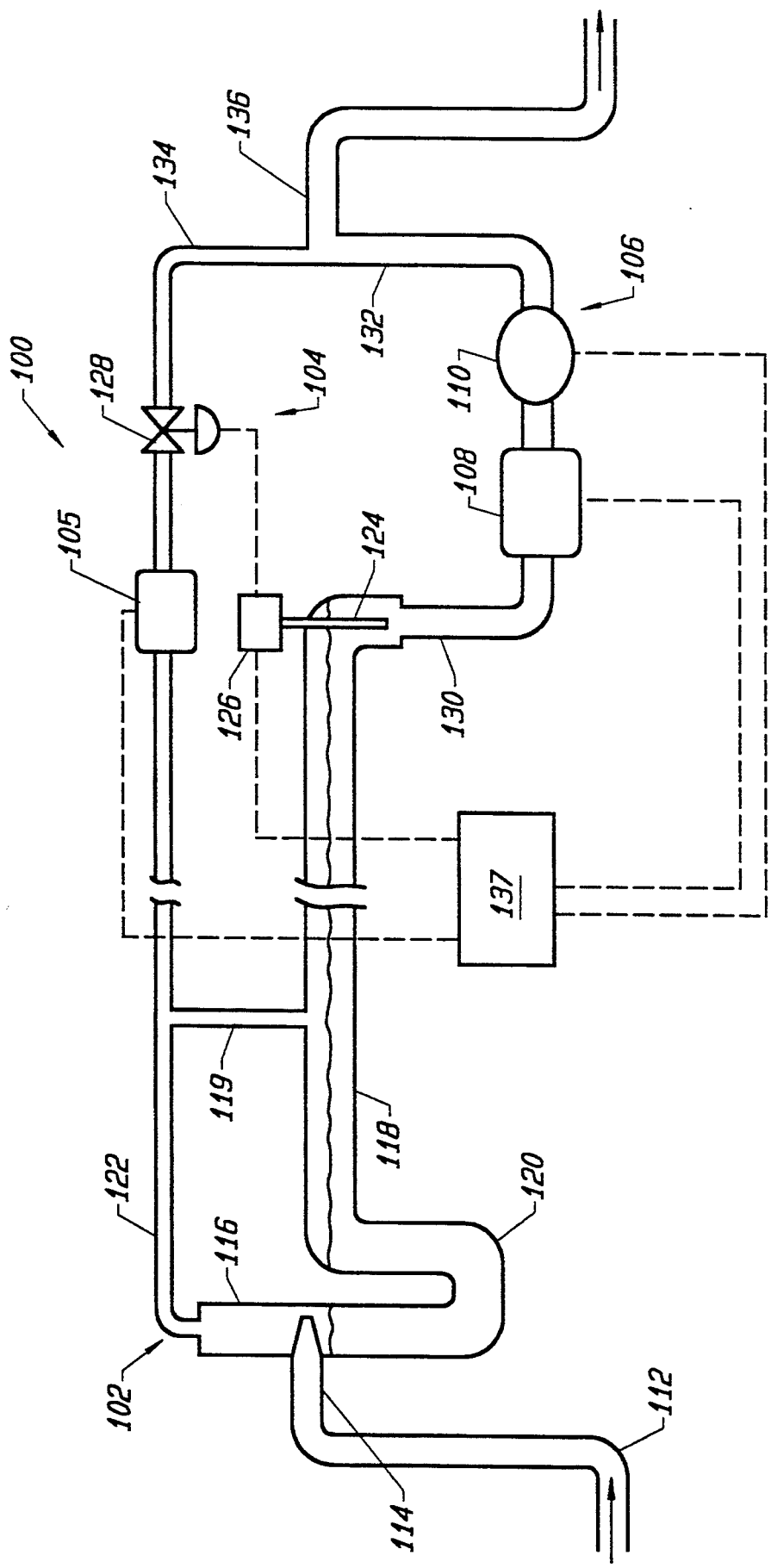
FIG. 1 illustrates a preferred three-phase metering system according to one embodiment of the invention.

With reference to FIG. 1, the three-phase flow measurement system 100 generally includes a gas eliminator assembly 102, a liquid level control mechanism 104, gas discharge lines 119, 122, a gas flow meter 105, a liquid discharge line 106, a liquid flow meter 108, and a liquid phase fraction meter 110. The gas eliminator separates the liquid and gaseous components. The gas flow meter measures the gas flow rate, while the liquid flow meter/liquid phase fraction meters measure relevant liquid flow rates. The streams are then recombined and discharged.

In one specific embodiment, a multi-phase petroleum production stream flows from a production flow line 112 to an inlet pipe 114 such that the longitudinal axis of inlet pipe 114 is either substantially horizontal or angled depending on the application. The gas eliminator assembly includes a vertical pipe section 116 and a horizontal pipe section 118, connected together with a U-shaped pipe section 120. The diameter of the vertical pipe section can be the same as or smaller than or larger than the diameter of the horizontal pipe section depending upon the application. In slug flow conditions, for example, the cross-sectional area of the vertical pipe section may be larger than the cross-sectional area of the horizontal pipe section to reduce the potential of a liquid phase from entering into the gas discharge line. Alternatively, fluids having small gas bubbles or high viscosities (typically oils) may have a horizontal pipe section with a smaller cross-sectional area than the cross-sectional area of the vertical pipe section. For such fluids, the horizontal pipe section may also be longer. The cross-sectional area and/or length of the horizontal pipe section is typically adjusted relative to the vertical pipe section to improve the transfer of gas from the fluid. The entire gas eliminator assembly is constructed with commercial grade steel pipes and fittings. The diameter of the gas eliminating pipe assembly is larger than that of the inlet pipe 114, and its absolute size will obviously depend heavily on the application.

The inlet pipe 114 is tangentially connected to the side of the vertical section 116 of the gas eliminator assembly. A first gas discharge pipe 122 connects to the top of the vertical section 116 of the gas eliminator assembly. A second gas discharge pipe 119 connects the top of the horizontal section 118 of the gas eliminator to the first gas discharge pipe 122. Although FIG. 1 only shows two gas discharge pipes, additional gas discharge pipes can be added in parallel to gas discharge pipe 119 depending on the particular application. A conventional gas flow meter 105, such as an orifice meter, a turbine meter, or a vortex shedding meter, is located in the gas discharge pipe.

Liquid level in the horizontal section 118 is maintained at a constant level with a level control assembly including a liquid level sensing device 124, a controller/transmitter 126, and a control valve 128 located in the gas flow line downstream of the gas flow meter 105.

A liquid discharge pipe 130 connects to the horizontal section 118 downstream of the level control assembly. The liquid discharge pipe may have a diameter relatively smaller than the diameter of the gas eliminator pipe and a diameter substantially equal to the diameter of the inlet line. The liquid discharge line also points downward from the gas eliminator assembly. A conventional liquid flow meter 108, such as a turbine meter, a positive displacement meter, or a Coriolis mass flow meter connects to pipe 130 and measures the flow rate of the liquid mixture stream. A liquid fraction meter 110 optionally connects downstream of the liquid flow meter 108.

In an oil production flow line, the liquid fraction meter is commonly referred to as water cut analyzer. Examples of some of the water cut analyzer include those based on capacitance measurement, microwave measurement, radio frequency energy absorption, and density differential principles. When a Coriolis force flow meter is employed as a liquid flow meter 108, it can simultaneously serve as a water cut analyzer because this type of flow meter also provides density measurement of the liquid mixture, as described in U.S. Pat. Nos. 4,773,257 and 4,689,989, incorporated herein by reference for all purposes.

After exiting from the water cut meter 110, the liquid mixture flows upwardly through a riser pipe 132 and combines with the gas flowing from a gas outlet pipe 134. The recombined multiphase stream is discharged through a horizontal flow pipe 136. The longitudinal axis of pipe 136 is higher than the liquid flow meter 108 and water cut meter 110 to keep these instruments liquid-filled at all times. Preferably, the longitudinal axis of pipe 136 is near or at the same vertical height as the longitudinal axis of the horizontal section of the gas eliminator.

Optionally, the system is monitored by and/or controlled by a master controller 137. The master controller may regulate flow into/out of the system and monitor/calculate relative flow rates, combined flow rates and other data. The master controller may take any one of a variety of forms including, for example, an appropriately controlled microprocessor, dedicated hardware, or the like. In some embodiments the master controller may also perform operations such as cumulative volume calculation, data recordation, and data transmission to a remote site.

In operation, as the multiphase fluid mixture enters the vertical section of the gas eliminator assembly 116, most of the large gas bubbles are separated from the liquid, move upward, and exit to the gas discharge line 122. The tangential entry design of the inlet pipe 114 causes the incoming multiphase fluid mixture to swirl. This further enhances gas/liquid separation. However, a certain amount of small gas bubbles will often not be effectively separated with these features alone. These small gas bubbles are carried downward by the liquid stream, pass through the U-shaped pipe section 120 and flow to the horizontal section 118 of the gas eliminator assembly.

The horizontal section of the gas eliminator provides a desirable environment for these small gas bubbles to be effectively and completely removed because: 1) the flow stream in this section is smooth and calm (due to its large diameter), 2) the liquid layer through which the bubbles need to rise is thin, and 3) the effective liquid/gas surface area for the gas bubbles to escape is large. The liquid stream is essentially gas-free as it is discharged from the gas eliminator assembly. For applications where more liquid retention time is required to achieve complete gas removal, such as in situations where gas bubbles are very small or liquid viscosity is very high, a long length of the horizontal section can be used with minimum incremental cost. There is virtually no restriction regarding the length, the layout and the configuration of the horizontal section. The horizontal section can be constructed in a straight line, or in looping or serpentine configurations to preserve space. The length can also be from 1 to 200 feet, but preferably between 5 to 40 feet in typical oil field operations.

Alternatively, the following design guideline provides a minimum length ($L_{min}$) of the horizontal section:

$$L_{min} = V \, t_{gas} \tag{1}$$

where V is the velocity of the liquid in the horizontal section and $t_{gas}$ is the gas bubble rising time. Stoke's Law estimates the gas bubble rising time as follows:

$$t_{gas} = 4.664 \times 10^4 \frac{H\mu_{liq}}{S_{liq}d_{gas}^2} \tag{2}$$

where:
  $t_{gas}$ = time for the gas bubble to rise from the bottom of the pipe to the liquid surface,
  H = height of liquid in the horizontal pipe,
  $\mu_{liq}$ = viscosity of liquid,
  $S_{liq}$ = Specific gravity of liquid,
  $d_{gas}$ = diameter of gas bubble.

For example, a well producing 1000 barrels of liquid (oil plus water) per day includes a 6-inch diameter horizontal pipe and a liquid level controlled at a 4-inch height (i.e., H=4 inches). Other process conditions are: liquid viscosity ($\mu_{liq}$) at 5 centipoise; specific gravity of liquid ($S_{liq}$) at 0.9; and diameter of the smallest gas bubbles at 150 microns. Based on these conditions, liquid velocity (v), is at 0.47 ft/sec, and Stoke's Law calculates gas bubble rising time ($t_{gas}$) at 46.1 seconds. From the liquid velocity and gas bubble rising time, the design guideline provides a minimum length ($L_{min}$) of the horizontal section at 21.7 feet.

The liquid level mechanism (124, 126, 128) regulates the liquid level in the horizontal section at a constant height. The liquid level probe detects the liquid level in the pipe. Depending on the liquid level, the control valve 128 will open or close. If the liquid level is below the desired set point, the controller unit 126 sends a signal to open the control valve 128. If the liquid level is higher than the desired set point, then the valve will partially or completely close. Pressure in the gas space in the horizontal section will therefore rise slightly, forcing the rate of liquid discharge to increase thus lowering the liquid level. If the level is near the set point, the gas control valve will be partially open.

Figure 2:
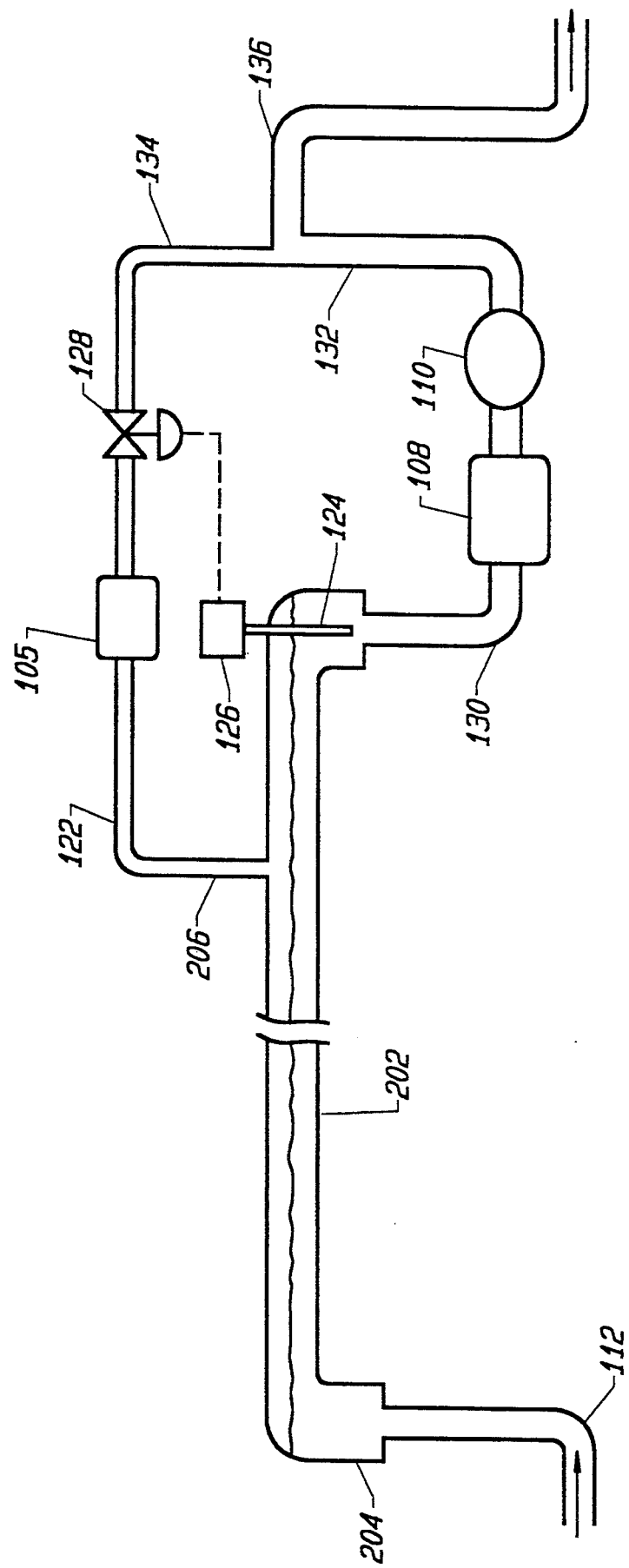
FIG. 2 shows an alternate three-phase metering system for application situations where gas fraction in the multi-phase flow is relatively low.

FIG. 2 illustrates an alternate apparatus in which the vertical section of the gas eliminator as shown in FIG. 1 is omitted. Similar features carry the same reference numbers. The multiphase fluid flowing in the pipe 112 enters the horizontal section 202 of the gas eliminator assembly through the inlet pipe 204. Only one gas discharge line 206 is needed. This system is preferably applied for measuring multiphase flow with relatively low gas fraction in the mixture. The apparatus may provide continuous on-line separation and measurement for the multiphase flow.

Figure 3:
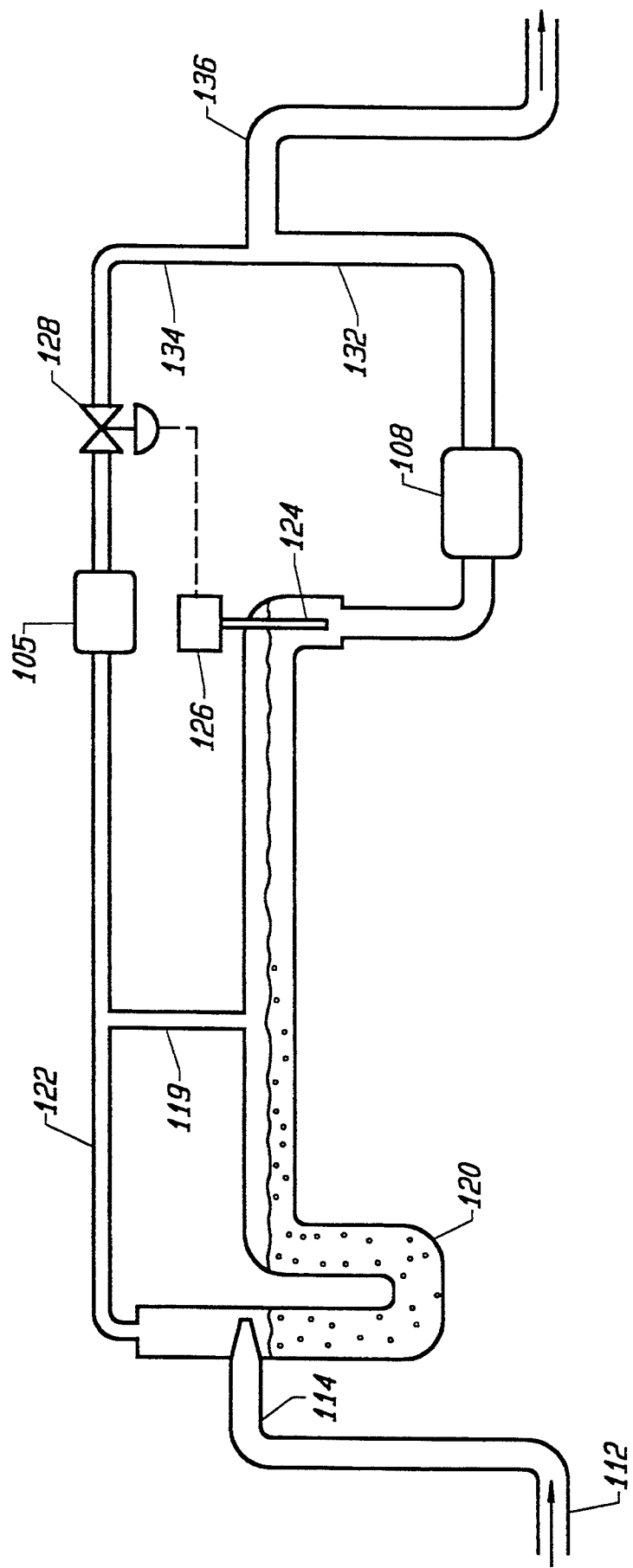
FIG. 3 shows a preferred two-phase metering system.

FIG. 3 depicts another device for measuring a two-phase flow (one gas and one liquid component). Since only one liquid component is present, the liquid fraction meter shown in FIG. 1 is omitted in this device.

Figure 4:
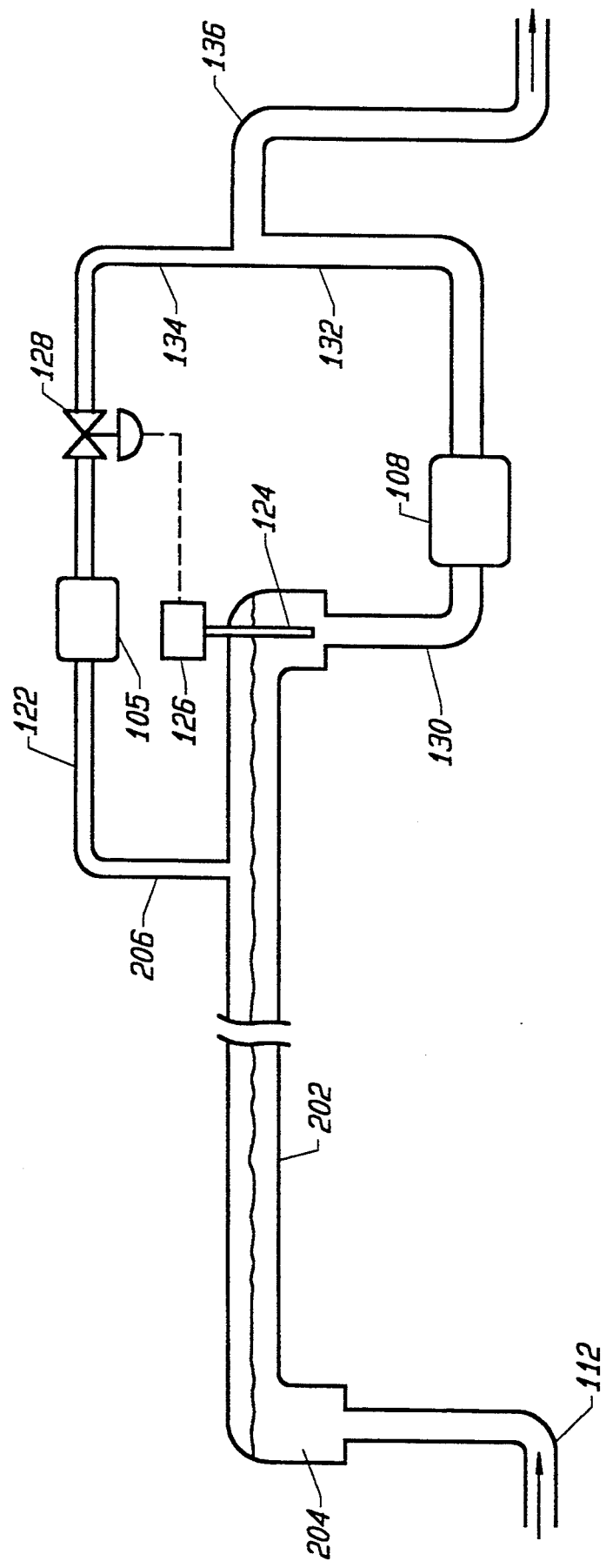
FIG. 4 shows an alternate two-phase metering system for application situations where gas fraction in the multi-phase flow is relatively low.

FIG. 4 depicts yet another device similar to that illustrated in FIG. 2 for a two-phase flow (one gas and one liquid component). Since only one liquid component is present, the liquid fraction meter shown in FIG. 2 is omitted in this apparatus.

The various embodiments of the method and device have a number advantages over certain prior devices and methods For example, the entire system may be made from commonly used flow pipes and instruments. This implies low cost. Further, all of the measurement devices utilize commercially proven technologies. This implies reliable operation. Still further, the piping arrangement facilitates the use of one simple control mechanism for the entire system. This implies low maintenance. Still further, there is virtually no pressure drop across the system. This implies high operation efficiency.

EXAMPLES

To prove the principle and demonstrate the operation of the method and apparatus, a laboratory flow facility was constructed and operated. Air and water were used as the test fluids. This flow facility included a water supply system (water reservoir, water pump, water flow meter), an air supply system (air compressor, air flow meter), a gas eliminator pipe assembly, and a liquid level control system (liquid level sensor, controller, and control valve in the gas discharge line). Because the main objective of the flow facility was to demonstrate the operability of the invented system, the gas flow meter 105, the liquid flow meter 108, and liquid fraction meter 110 described in FIGS. 1 through 4 were omitted.

All flow pipes were made of PVC (polyvinyl chloride) of various sizes: 1¼" pipe for the air/water inlet, 6" pipe for the gas eliminator assembly, 2" pipe for the liquid discharge line, 2" for the air/water discharge pipe, and 1" pipe for the gas discharge line. The overall length of the gas eliminator pipe was 14 feet, with the horizontal pipe section of the gas eliminator assembly located 4 ft. above ground. The entire length of gas eliminator assembly and portions of liquid discharge pipe and air/water discharge pipe were made of clear PVC to facilitate visual observations.

Two versions of the gas eliminator assembly design were tested. The first version was constructed to simulate the system depicted in FIGS. 1 and 3 in which the gas eliminator assembly included a vertical section and a horizontal section. Flow rates of air varied from 2 to 5 cubic feet per minute and water from 10 to 40 gallons per minute. The majority of the air was separated in the discharge line under all combinations of air and water flow rates tested. It should be mentioned that the highest air and water flow rates tested here are by no means the upper limits for the invented system; they were the upper limits of the capacities of the water pump and air compressor.

The second version of the gas eliminator assembly to simulated the system depicted in FIGS. 2 and 4 in which the gas eliminator assembly included only a horizontal pipe section. Identical operating conditions were used and similar test results were obtained. A notable difference as compared to the previous version was that it took about 3 to 5 feet of horizontal pipe length for the air bubbles to completely dissipate. Another series of tests were conducted by increasing the viscosity of the water to 1.7 centipoise. High viscosity water was obtained by adding a water-soluble polymer to tap water which had a viscosity of about 0.8 centipoise. Test results showed that the increase in water viscosity did not affect the operation of the system.

Although the foregoing invention has been described in some detail by way of illustration and example, for purposes of clarity of understanding, it will be obvious that certain changes and modifications may be practiced within the scope of the appended claims.

The above description is illustrative and not restrictive. Many variations of the invention will become apparent to those of skill in the art upon review of this disclosure. Merely by way of example the invention may used to measure flow in many applications other than oil/water/gas applications. The scope of the invention should, therefore, be determined not with reference to the above description, but instead should be determined with reference to the appended claims along with their full scope of equivalents.

What is claimed is:

1. A system for determining the flow rate of at least first and second components in a multiphase flow stream comprising:
   an inlet flow line;
   a substantially horizontal flow line coupled to said inlet flow line, said substantially horizontal flow line of significantly greater cross-sectional area than said inlet flow line;
   a gas flow line adapted to receive gas from said inlet flow line;
   a level control means in said substantially horizontal flow line, said level control means coupled to a liquid discharge line and adapted to retain a substantially constant level in said horizontal flow line, said liquid discharge line of significantly smaller cross-sectional area than said horizontal flow line;
   liquid flow measurement means in said liquid discharge line; and
   gas flow measurement means in said gas flow line.

2. The system recited in claim 1 further comprising:
   an outlet line coupled to said liquid discharge line and said gas flow line, an output of said liquid discharge line and an output of said gas flow line recombined in said outlet line.

3. The system as recited in claim 1 further comprising:
   means for determining the relative flow rates of two liquid phases in said liquid discharge line.

4. The system as recited in claim 3 wherein said liquid flow measurement means and said means for determining the relative flow rates of two liquid phases comprises:
   a coriolis flow meter; and
   a microprocessor for calculating the relative flow rates of said two liquid phases based on output of said coriolis flow meter.

5. The system as recited in claim 1 further comprising:
   a vertical pipe section connecting said inlet flow line to said substantially horizontal flow line and said gas flow line, said inlet flow line entering said vertical pipe section at an intermediate portion thereof.

6. The system as recited in claim 1 further comprising a gas flow pipe connected to an upper portion of said horizontal flow line at an intermediate portion thereof.

7. The system as recited in claim 1 wherein said level control means comprises:
   level sensing means in said horizontal flow line;
   a control valve in said gas flow line, said control valve coupled to said level sensing means such that as a liquid level rises in said horizontal flow line said control valve restricts flow through said gas flow line.

8. The system as recited in claim 5 wherein said vertical pipe section includes a larger cross-sectional area than said substantially horizontal flow line.

9. The system as recited in claim 5 wherein said vertical pipe section includes a substantially same cross-sectional area as said substantially horizontal pipe.

10. A method for determining the flow rate of at least first and second components in a multiphase flow stream comprising the steps of:
    passing said multiphase flow stream comprising at least a first component and a second component from an inlet flow line through a substantially horizontal flow line, said substantially horizontal flow line being of significantly greater cross-sectional area than said inlet flow line;
    controlling said multiphase flow stream to retain a substantially constant level in said horizontal flow line;
    separating said first component from said multiphase flow stream in said horizontal flow line through a gas flow line adapted to receive gas from said inlet flow line;
    transferring a remaining portion of said multiphase flow stream comprising at least said second component in said horizontal flow line into a liquid discharge line;
    measuring at least said second component in said liquid discharge line; and
    measuring at least said first component in said gas flow line.

11. The method recited in claim 10 further comprising the step of:
    combining said first component from said gas flow line with said at least second component from said liquid discharge line into an outlet line.

12. The method as recited in claim 10 further comprising the steps of:

determining the relative flow rates of two liquid phases in said liquid flow line.

13. The method as recited in claim 12 wherein said step of determining the relative flow rates occurs by using at least a coriolis flow meter and a microprocessor for calculating the relative flow rates of said two liquid phases based on an output of said coriolis flow meter.

14. The method as recited in claim 10 wherein said passing step further comprising a step of:
   passing said multiphase flow stream through a vertical pipe section connecting said inlet flow line to said substantially horizontal flow line and said gas flow line, said inlet flow line entering said vertical pipe section at an intermediate portion thereof.

15. The method as recited in claim 10 further comprising a step of separating a portion of said first component through at least a second gas flow pipe connected to an upper portion of said horizontal flow line at an intermediate portion thereof.

16. The method as recited in claim 10 wherein said controlling step further comprising the steps of:
   sensing a liquid level in said horizontal flow line; and
   restricting flow through said gas flow line as said liquid level rises in said horizontal flow line.

17. The method as recited in claim 14 wherein said vertical pipe section includes a larger cross-sectional area than said substantially horizontal flow line.

18. The method as recited in claim 14 wherein said vertical pipe section includes a substantially same cross-sectional area as said substantially horizontal flow line.

* * * * *